(12) United States Patent
Matsuda et al.

(10) Patent No.: US 8,172,143 B2
(45) Date of Patent: May 8, 2012

(54) CODE READING DEVICE (75) Inventors: Hajime Matsuda, Osaka (JP); Shigeo Nakamura, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 13/153,500

(22) Filed: Jun. 6, 2011

(65) Prior Publication Data

US 2011/0309148 A1 Dec. 22, 2011

(30) Foreign Application Priority Data

Jun. 18, 2010 (JP) ................................. 2010-139814

(51) Int. Cl.
*G06K 7/14* (2006.01)
(52) U.S. Cl. .............. 235/454; 235/462.01; 235/462.09; 235/462.1; 235/462.11; 235/462.14; 235/462.41
(58) Field of Classification Search .................. 235/454, 235/462.01, 462.09, 462.1, 462.11, 462.14, 235/462.41
See application file for complete search history.

(56) References Cited

U.S. PATENT DOCUMENTS

2010/0001073 A1* 1/2010 Ehrhart ................. 235/462.11

FOREIGN PATENT DOCUMENTS

| JP | 2008-059194 | 3/2008 |
| JP | 2009-271579 | 11/2009 |

* cited by examiner

*Primary Examiner* — Kristy A Haupt
(74) *Attorney, Agent, or Firm* — Kilyk & Bowersox, P.L.L.C.

(57) ABSTRACT

Provided is a code reading device capable of reducing a time from start of reading of a symbol code until a decoded result is transmitted to an external device. The code reading device includes first and second CPUs that access a shared memory, an imaging element that optically reads the symbol code to generate a read image, and a DMAC that transfers the read image from the imaging element to the shared memory. The first CPU decodes the read image in the shared memory based on a command of the second CPU. The second CPU selectively executes any one of an imaging control task, a decode control task, and a decoded result transmission task, in which the imaging control task is given priority over the decode control task, and the decode control task is given priority over the decoded result transmission task.

5 Claims, 5 Drawing Sheets

CODE READING DEVICE

CROSS-REFERENCE TO RELATED APPLICATIONS

The present application claims foreign priority based on Japanese Patent Application No. 2010-139814, filed Jun. 18, 2010, the contents of which is incorporated herein by reference.

BACKGROUND OF THE INVENTION

1. Field of the Invention

The present invention relates to a code reading device, and more particularly, to improvement of the code reading device which optically reads a symbol code such as a bar-code or a two-dimensional code, decodes an obtained read image, and transmits a decoded result to an external device.

2. Description of the Related Art

A code reading device called a code reader optically reads a bar-code or a two-dimensional code marked on a work, generates a read image, decodes the read image, and outputs a decoded result. In general, the code reader includes an optical reading element that optically reads the code, a memory to hold the read image, a processor that decodes the read image, and a transmitting and receiving circuit that transmits the decoded result to an external device. The decoded result is transmitted to a terminal device such as a PC (Personal Computer) or a control device such as a PLC (Programmable Logic Controller) through a LAN (Local Area Network) such as Ethernet (registered trademark) or a serial communication interface such as RS-232C.

In recent years, in an image sensing type reading device which analyzes and decodes image data read from a work in units of frame, a CMOS (Complementary Metal Oxide Semiconductor) image sensor is used as an optical reading element in order to reduce production cost and power consumption. Recently, larger capacity of information amount is required due to a request to implement high resolution of a read image, so that it is necessary to speed up an image process.

SUMMARY OF THE INVENTION

The present invention has been made in view of the above circumstances, and an object thereof is to provide a code reading device capable of reducing a time from start of reading of a symbol code until a decoded result is transmitted to an external device.

According to one embodiment of the present invention, a code reading device includes first and second processors that access a shared memory through a common data bus, an optical reading element that optically reads a symbol code to generate a read image, a transmitting and receiving circuit that receives a command to start a reading operation from an external device, and a DMA controller that transfers the read image from the optical reading element to the shared memory through the data bus. The first processor includes a decoding device that decodes the read image in the shared memory, based on a command of the second processor, and writes a decoded result in the shared memory, and the second processor selectively executes any one of an imaging control task that controls the optical reading operation by the optical reading element based on the command to start the reading operation, a decode control task that commands the first processor to decode the read image based on transfer completion of the read image by the DMA controller, and a decoded result transmission task that controls transmission of the decoded result from the transmitting and receiving circuit to the external device, and the imaging control task is given priority over the decode control task, and the decode control task is given priority over the decoded result transmission task.

According to the above code reading device, the shared memory is accessed by the first processor that decodes the read image, and the second processor that controls the optical reading by the optical reading element and controls the transmission of the decoded result from the transmitting and receiving circuit to the external device, through the common data bus. At this time, the second processor allocates priorities to the imaging control task that controls the optical reading by the optical reading element, the decode control task that commands the first processor to decode the read image, and the decoded result transmission task that controls the transmission of the decoded result, in this order and selectively executes any one of the tasks. According to such a configuration, while the first processor decodes the read image, the second processor efficiently executes the imaging control task, the decode control task, and the decoded result transmission task, the time from the start of the reading of the symbol code until the decoded result of the read image is transmitted to the external device can be reduced.

According to another embodiment of the present invention, in addition to the above configuration, the code reading device is configured in such a manner that the second processor selectively executes any one of an image data transmission task that controls transmission of the read image from the transmitting and receiving circuit to the external device, the imaging control task, the decode control task, and the decoded result transmission task, and the decoded result transmission task is given priority over the image data transmission task.

According to such a configuration, the second processor allocates priorities to the imaging control task, the decode control task, the decoded result transmission task, and the image data transmission task in this order and selectively executes any one of the tasks, so that while the first processor decodes the read image, the second processor can efficiently execute the imaging control task, the decode control task, the decoded result transmission task, and the image data transmission task. Therefore, the time from the start of the reading of the symbol code until the decoded result is transmitted to the external device can be reduced.

According to another embodiment of the present invention, in addition to the above configuration, the code reading device is configured in such a manner that the shared memory includes a nonvolatile memory, the second processor selectively executes any one of an image saving task that writes the read image in the shared memory into the nonvolatile memory, the imaging control task, the decode control task, the decoded result transmission task, and the image data transmission task, and the image data transmission task is given priority over the image saving task.

According to such a configuration, the second processor allocates priorities to the imaging control task, the decode control task, the decoded result transmission task, the image data transmission task, and the image saving task in this order and selectively executes any one of the tasks, so that while the first processor decodes the read image, the second processor can efficiently execute the imaging control task, the decode control task, the decoded result transmission task, the image data transmission task, and the image saving task. Therefore, the time from the start of the reading of the symbol code until the read image is stored in the nonvolatile memory can be reduced.

According to another embodiment of the present invention, in addition to the above configuration, the code reading device is configured in such a manner that the shared memory holds a reference task number of the read image provided in association with the read image, and the second processor commands the DMA controller to transfer the read image by overwriting to the shared memory based on the reference task number, increments the reference task number when any one of the imaging control task and the decode control task is executed, and decrements the reference task number when any one of the image data transmission task and the image saving task is executed.

According to such a configuration, the command to transfer the read image data by overwriting to the shared memory is given to the DMA controller based on the reference task number held in association with the read image, so that the read image generated by the optical reading element can be efficiently stored in the shared memory.

According to the code reading device of the present invention, while the first processor decodes the read image, the second processor efficiently executes the imaging control task, the decode control task, and the decoded result transmission task. Therefore, the time from the start of the reading of the symbol code until the decoded result is transmitted to the external device can be reduced.

DETAILED DESCRIPTION OF PREFERRED EMBODIMENTS

<Reading System>

Figure 1:
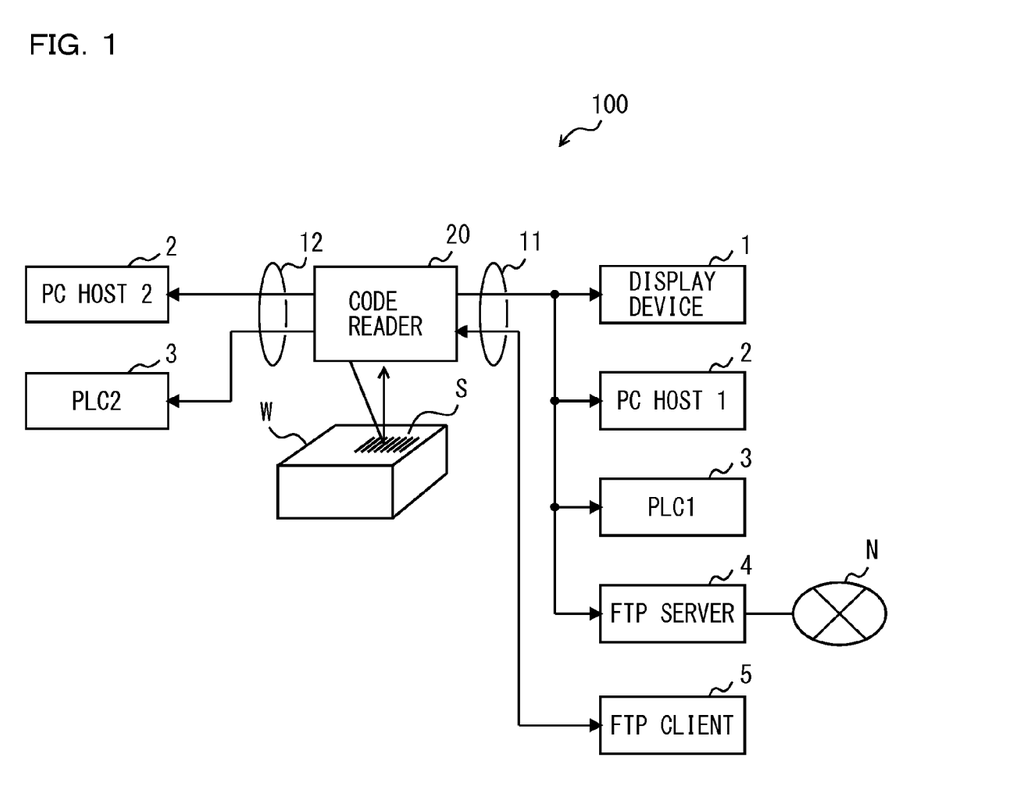
FIG. 1 is a system diagram showing one configuration example of a reading system including a code reading device according to an embodiment of the present invention.

FIG. 1 is a system diagram showing one configuration example of a reading system 100 including a code reading device according to an embodiment of the present invention, in which a code reader 20 is shown as one example of the code reading device. The reading system 100 includes the code reader 20 that optically reads a symbol code S marked on a work W to decode a read image, an external device that communicates with the code reader 20 through a LAN 11, and an external device that communicates with the code reader 20 through a serial communication interface 12. The reading system 100 transmits the read image read by the code reader 20 and a decoded result of the read image to the external device.

The LAN 11 is a communication network such as Ethernet, and the external devices connected to the code reader 20 through the LAN 11 include a display device 1, a PC 2, a PLC 3, an FTP server 4, and an FTP client 5. The display device 1 is provided with a display with touch panels, and can set an imaging parameter in reading the code, and a parameter in decoding the read image to the code reader 20 by operating a display screen. The read image and the decoded result transferred from the code reader 20 are displayed on the display screen in the display device 1.

The PC 2 is a terminal device provided with a display part and an operation part, and can set the imaging parameter and the decoding parameter for the code reader 20. The PLC 3 is a control device that operates based on a rewritable ladder program, and controls an input/output device such as a sensor and a driving device. The PLC 3 commands the code reader 20 to start a reading operation, or obtains the decoded result from the code reader 20.

The FTP (File Transfer Protocol) server 4 is an information processing device that communicates with another communication device on a communication network N, based on a TCP/IP (Transmission Control Protocol/Internet Protocol), and transmits a data file to the communication device, based on a file transfer request from the communication device on the communication network N. The FTP client 5 is an information processing device that performs communication, based on the TCP/IP, and obtains the data file from the FTP server 4, based on the FTP.

The code reader 20 holds the read image used in the decoding process, as an image file, and transmits the image file to the FTP server 4 after the decoding process. In addition, the code reader 20 transmits the image file to the FTP client 5, based on a file transfer request from the FTP client 5.

The serial communication interface 12 is an interface that performs serial communication, based on a predetermined protocol defined by communication standard such as RS-232C. The external devices connected to the code reader 20 through the serial communication interface 12 include a PC 2 and a PLC 3.

The read image read by the code reader 20 is transmitted to the display device 1 or the PC "PC host 1" through the LAN 11. Meanwhile, the decoded result of the read image is transmitted to at least one of the display device 1, the PC "PC host 1", and PLC "PLC 1" through the LAN 11, and the PC "PC host 2" and the PLC "PLC 2" through the serial communication interface 12.

The code reader 20 is a fixed type code reader in which a reading unit optically reading a symbol code S is arranged around a carrier line of the work W, and reads the symbol codes S from the works W that are carried one after another. The symbol code S to be read includes a bar-code and a two-dimensional code.

<Code Reader>

Figure 2:
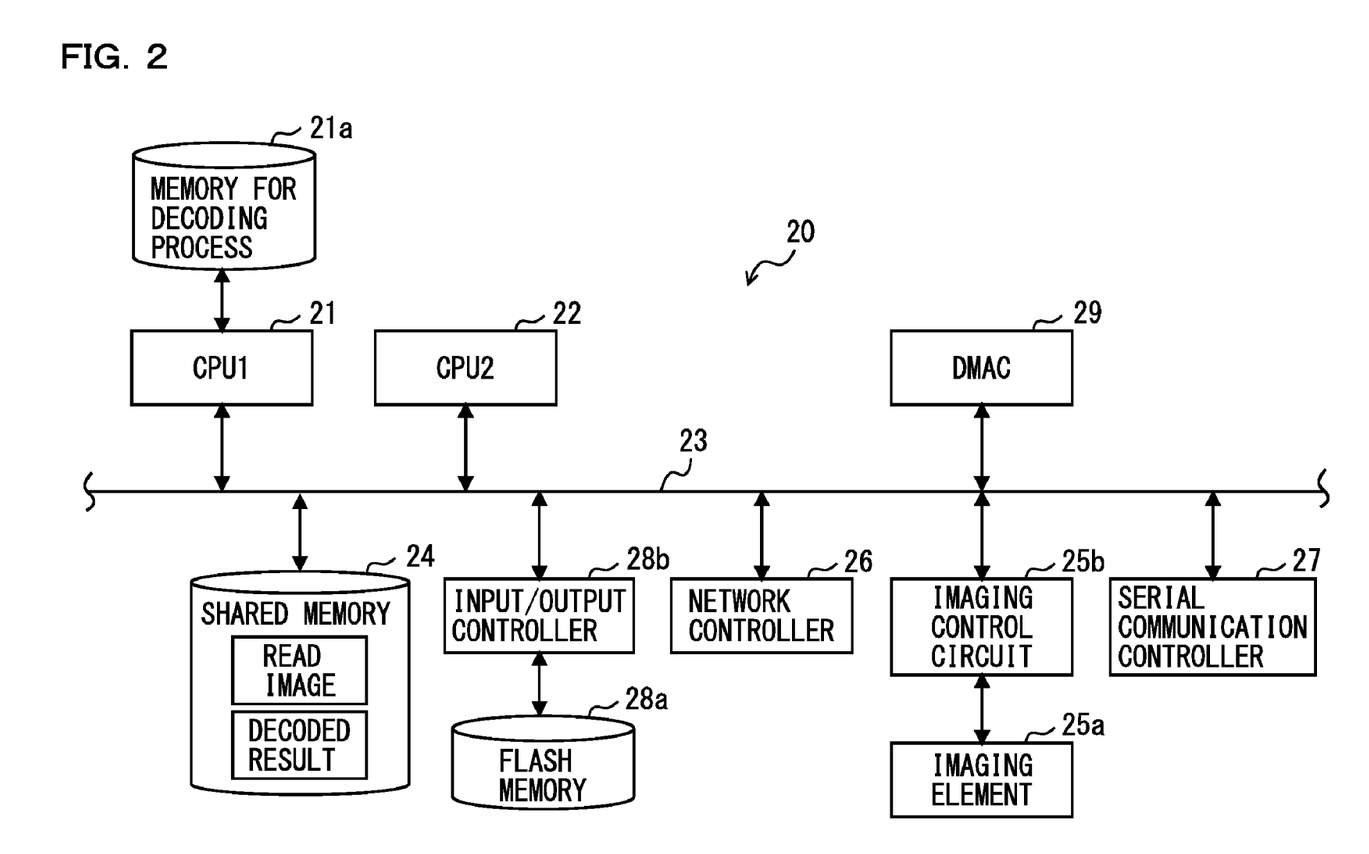
FIG. 2 is a block diagram showing one configuration example of a code reader in the reading system shown in FIG. 1, in which one example of a functional configuration in the code reader is shown.

FIG. 2 is a block diagram showing one configuration example of the code reader 20 in the reading system 100 shown in FIG. 1, in which one example of a functional configuration in the code reader 20 is shown. The code reader 20 includes CPUs 21 and 22, a memory 21a for decoding process, a shared bus 23, a shared memory 24, an imaging element 25a, an imaging control circuit 25b, a network controller 26, a serial communication controller 27, a flash memory 28a, an input/output controller 28b, and a DMAC 29. Hereinafter, the CPU 21 is referred to as the "CPU 1", and the CPU 22 is referred to as the "CPU 2" occasionally.

The CPUs 21 and 22 are processors that access the shared memory 24 through the shared bus 23, and each of the CPUs 21 and 22 includes a predetermined arithmetic processing circuit. The shared bus 23 is a data bus shared by the CPUs 21 and 22. The shared memory 24 includes a nonvolatile semiconductor memory element such as a RAM (Random Access Memory) to hold the imaging parameter, the decoding parameter, the read image, and the decoded result.

The imaging element 25a is an optical reading element that receives reflected light from the work W to generate the read image, and for example, a CMOS imaging sensor is used for the imaging element 25a. The imaging control circuit 25b includes an amplifier that amplifies an image signal from the imaging element 25a, and an A/D converter that converts the amplified image signal to a digital signal, and the imaging control circuit 25b controls the imaging element 25a, based on the imaging parameters in the shared memory 24, such as an exposure time, a gain, and presence or absence of a filtering process.

The DMAC (Direct Memory Access Controller: DMA controller) 29 transfers the read image generated by the imaging element 25a from the imaging control circuit 25b to the shared memory 24 through the shared bus 23.

The network controller 26 is a communication circuit such as an EMAC (Ethernet Media Access Controller) that communicates with the external device through the LAN 11. The serial communication controller 27 is a communication circuit such as a UART (Universal Asynchronous Receiver Transmitter) that communicates with the external device thorough the serial communication interface 12.

The flash memory 28a includes a nonvolatile semiconductor memory element to hold the image file, and a detachable memory card such as an SD (Secure Digital (registered trademark)) card may be used for the flash memory 28a. The input/output controller 28b controls the writing and reading of the image file in the flash memory 28a.

The CPU 21 includes a decoding device that reads the read image from the shared memory 24 into the memory 21a for decoding process, based on a command of the CPU 22, and writes the decoded result in the shared memory 24 after the decoding process.

Meanwhile, the CPU 22 commands the imaging control circuit 25b to start the reading operation when the network controller 26 or the serial communication controller 27 receives a command and the command is a reading start command to start the reading operation.

In addition, the CPU 22 commands the CPU 21 to decode the transferred read image, based on completion of the transfer of the read image by the DMAC 29. Furthermore, the CPU 22 commands the network controller 26 and the serial communication controller 27 to transfer the decoded result of the read image.

The CPU 22 reads the read image used in the decoding process from the shared memory 24, and writes the read image in the flash memory 28a or writes the read image in the shared memory 24, as the image file. The image file is written after the decoding process has been completed.

After the decoding process has been completed, the CPU 22 controls the transmission of the image file in the shared memory 24 to the FTP server 4, and transmission of the image file in the shared memory 24 to the FTP client 5, based on the file transfer request from the FTP client 5. The CPUs 21 and 22 and the DMAC 29 are devices capable of occupying the shared bus 23 as a bus master, and the devices give an interrupt request to each other or detect the interrupt request.

Figure 3:
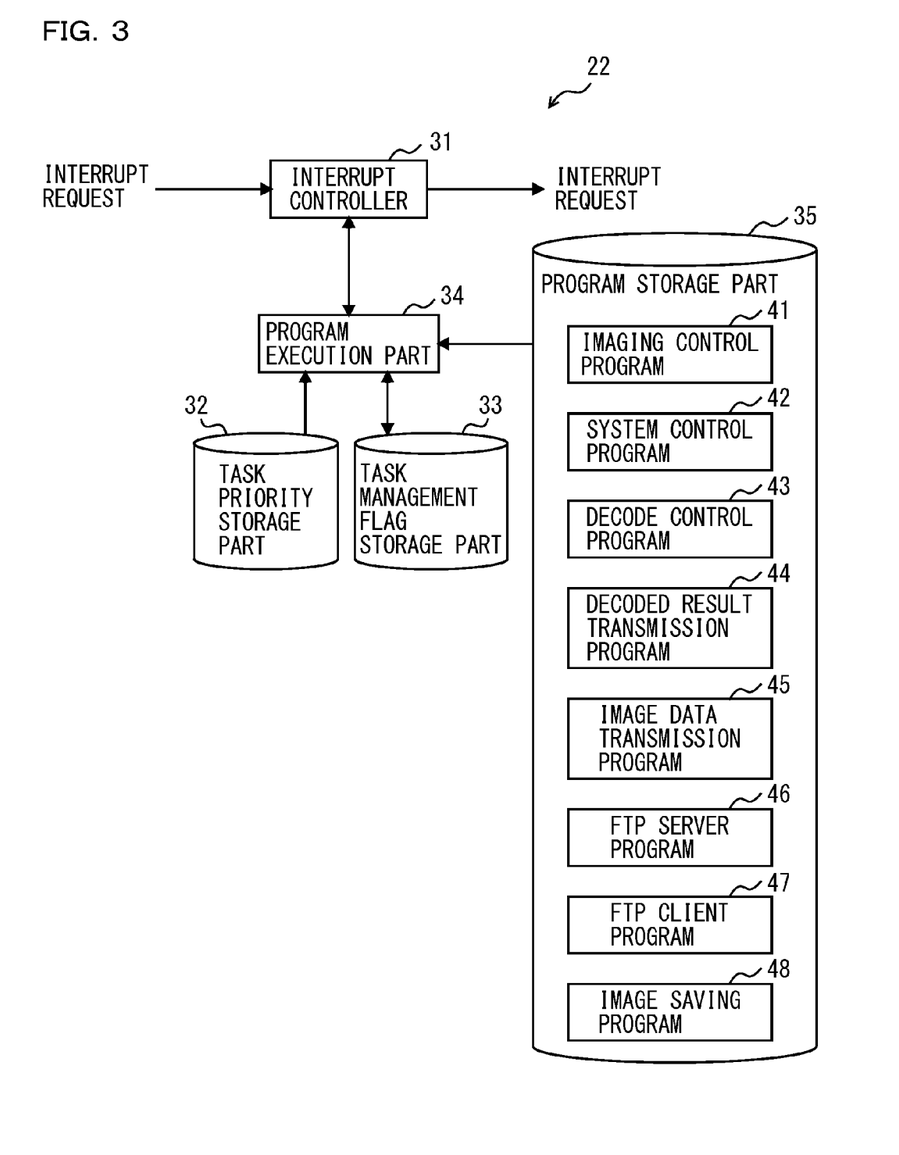
FIG. 3 is a block diagram showing a configuration example of a CPU in the code reader shown in FIG. 2.

FIG. 3 is a block diagram showing a configuration example of the CPU 22 in the code reader 20 in FIG. 2. The CPU 22 includes an interrupt controller 31, a task priority storage part 32, a task management flag storage part 33, a program execution part 34, and a program storage part 35. The program storage part 35 holds an imaging control program 41, a system control program 42, a decode control program 43, a decoded result transmission program 44, an image data transmission program 45, an FTP server program 46, an FTP client program 47, and an image saving program 48.

The CPU 22 performs priority scheduling in order to perform processing in parallel among the decoding process of the read image by the CPU 21, the imaging control, the transmission control of the decoded result, the transmission control of the read image, the transmission control of the image file to the FTP server 4, and the transmission control of the image file based on the file transfer request from the FTP client 5.

The priority scheduling means that priorities are allocated to the tasks executed by the CPU 22, that is, the processes executed by the programs, and when there are several tasks in an execution waiting state, CPU resources are allocated to the task having the highest priority among the tasks in the execution waiting state. Here, the execution waiting state is referred to as an executable state and differentiated from a resting state and an execution state.

More specifically, the priority scheduling is performed on the eight tasks including an imaging control task, a system control task, a decode control task, a decoded result transmission task, an image data transmission task, an FTP server task, an FTP client task, and an image saving task.

Here, as one example, the priorities are allocated to the imaging control task, the system control task, the decode control task, the decoded result transmission task, the image data transmission task, the FTP server task, the FTP client task, and the image saving task, in this order. More specifically, the imaging control task has the highest priority, the system control task has the second highest priority, the decode control task has the third highest priority, and the decoded result transmission task has the fourth highest priority. Thus, the image saving task has the lowest priority.

In other words, the imaging control task is given priority over the decode control task, and the decode control task is given priority over the decoded result transmission task. In addition, the decoded result transmission task is given priority over the image data transmission task, and the image data transmission task is given priority over the image saving task.

The interrupt controller 31 detects the interrupt request given through the shared bus 23, and outputs its detected result to the program execution part 34, and generates an interrupt request based on the command from the program execution part 34.

The program execution part 34 selectively executes any one of the imaging control program 41, the system control program 42, the decode control program 43, the decoded result transmission program 44, the image data transmission program 45, the FTP server program 46, the FTP client program 47, and the image saving program 48, based on the priority scheduling.

The task priority storage part 32 holds priority information of the task required for the priority scheduling. In addition, the task management flag storage part 33 holds a task management flag as identification information to determine whether the task is in the resting state, or in the executable state.

When the network controller 26 and the serial communication controller 27 receive a command, they notify the interrupt controller 31 of the reception of the command. When the program execution part 34 receives the command, it analyzes the command and operates based on its analyzed result.

For example, when the command is the reading start command to start the reading operation, and the imaging control task is in the resting state, the program execution part 34 executes the imaging control program 41 and commands the imaging control circuit 25b to start the reading operation. Meanwhile, when the command is a reading completion command to complete the reading operation, and the imaging control task is in the execution state, the program execution part 34 stops executing the imaging control program 41, and notifies the imaging control circuit 25b and the CPU 21 of a stop request.

The imaging control program 41 is provided for the imaging control task that commands the imaging control circuit 25b to start the reading operation and controls the optical reading operation, based on the reading start command. The system control program 42 is an interrupt handler to switch the program to be executed, based on the task priority information and the task management flag. The decode control program 43 is provided for the decode control task that commands the CPU 21 to decode the transferred read image, based on the transfer completion of the read image by the DMAC 29.

The decoded result transmission program 44 is provided for the decoded result transmission task that commands the network controller 26 and the serial communication controller 27 to transmit the decoded result. In the case where the imaging control program 41 is in the execution state when the transfer of the read image by the DMAC 29 is completed, the decode control program 43 is moved to the execution state after the imaging control program 41 has been moved to the resting state. In addition, the decode control program 43 moves the decoded result transmission program 44 to the executable state when a predetermined decode completion condition is established.

The decode completion condition means a decision criterion to determine whether to complete the decoding process or not, and when the decode completion condition is satisfied, the decoding process is completed and the imaging process is also completed. For example, the decode completion condition is defined such that the same decoded results are obtained equal to or more than predetermined times in series from the sequentially generated read images.

In the case where any of the imaging control program 41 and the decode control program 43 is in the execution state when the decoded result transmission program 44 is moved to the executable state, the decoded result transmission program 44 is moved to the execution state after the imaging control program 41 and the decode control program 43 have been moved to the resting state.

The image data transmission program 45 is provided for the image data transmission task that commands the network controller 26 and the serial communication controller 27 to transmit the read image in the shared memory 24. In the case where any of the imaging control program 41, the decode control program 43, and the decoded result transmission program 44 is in the execution state when the image data transmission program 45 is moved to the executable state, the image data transmission program 45 is moved to the execution state after these programs have been moved to the resting state.

The FTP server program 46 is provided for the FTP server task to transmit the image file in the shared memory 24 or the flash memory 28a to the FTP client 5, based on the file transfer request from the FTP client 5. The FTP server program 46 is a program to be moved to the executable state at regular time intervals.

In the case where any of the imaging control program 41, the decode control program 43, the decoded result transmission program 44, and the image data transmission program 45 is in the execution state when the FTP server program 46 is moved to the executable state, the FTP server program 46 is moved to the execution state after these programs have been moved to the resting state. Thus, after having been moved to the execution state, the FTP server program 46 checks whether or not there is a file transfer request from the FTP client 5. When the file transfer request exists, the FTP server program 46 transfers the image file and is moved to the resting state. On the other hand, when there is no file transfer request, the FTP server program 46 is immediately moved to the resting state.

The FTP client program 47 is provided for the FTP client task to transmit the image file in the shared memory 24 or the flash memory 28a to the FTP server 4. In the case where any of the imaging control program 41, the decode control program 43, the decoded result transmission program 44, the image data transmission program 45, and the FTP server program 46 is in the execution state when the FTP client program 47 is moved to the executable state, the FTP client program 47 is moved to the execution state after these programs have been moved to the resting state.

The image saving program 48 is provided for the image saving task that creates a file of the read image in the shared memory 24 and writes the created file in the shared memory 24 or the flash memory 28a. This image saving program 48 is a program to be moved to the executable state when the decode completion condition is established, and in the case where any of the imaging control program 41, the decode control program 43, the decoded result transmission program 44, the image data transmission program 45, the FTP server program 46, and the FTP client program 47 is in the execution state when the image saving program 48 is moved to the executable state, the image saving program 48 is moved to the execution state after these programs have been moved to the resting state.

Hereinafter, a description will be made of an operation of each task when the reading start command is received.

<Process 1>

First, the imaging control task is moved from the resting state to the executable state, based on the reading start command. At this time, since the imaging control task has the highest priority, it is immediately moved to the execution state, and commands the imaging control circuit 25b to start the imaging operation and then moved to the resting state.

<Process 2>

After the read image data has all been transferred to the shared memory 24 by the DMAC 29, the decode control task is moved from the resting state to the executable state. At this time, since the imaging control task having the higher priority is in the resting state, the decode control task is immediately moved to the execution state, and writes the decoding parameters such as a head address and a data size of the read image data transferred by the DMAC 29 in a predetermined position in the shared memory 24 and notifies the CPU 21 of the interrupt request.

The CPU 21 reads the decoding parameter from the shared memory 24, based on the above interrupt request from the CPU 22 and performs the decoding process of the read image, based on the above decoding parameter. In addition, the decode control task does not notify the CPU 21 of the interrupt request in the case where the CPU 21 is already performing the decoding process. In addition, after the decode control task has notified the CPU 21 of the interrupt request, it moves the imaging control task to the executable state at regular time intervals until the decode completion condition is established.

<Process 3>

The CPU 21 notifies the CPU 22 of the interrupt request after the decoding process of the read image has been completed. The decode control task is moved to the executable state, based on the above interrupt request from the CPU 21. At this time, in the case where the imaging control task is in the resting state, the decode control task immediately becomes the execution state, but in the case where the imaging control task is in the execution state, the decode control task becomes the execution state after the imaging control task has been moved to the resting state.

After the decode control task has been moved to the execution state, it moves the image data transmission task to the executable state. In addition, when the decode completion condition is established, it also moves the decoded result transmission task to the executable state. On the other hand, when the decode completion condition is not yet established and the decode control task has not yet notified the CPU 21 of the interrupt request in <process 2>, it notifies the CPU 21 of the interrupt request.

<Process 4>

After the decoded result transmission task has been moved to the executable state, it becomes the execution state after both of the imaging control task and the decode control task have been moved to the resting state, and transmits the decoded result to the external device. The decoded result transmission task is moved to the resting state after the decoded result has been transmitted.

<Process 5>

After the image data transmission task has been moved to the executable state, it becomes the execution state after the imaging control task, the decode control task, and the decoded result transmission task have all been moved to the resting state, and transmits the read image to the external device.

<Process 6>

The image saving task is moved to the executable state when the decode completion condition is established, or when it receives the reading completion command. After the image saving task has been moved to the executable state, it becomes the execution state after the imaging control task, the decode control task, the decoded result transmission task, the image data transmission task, the FTP server task, the FTP client task have all been moved to the resting state, and the image saving task creates the image file based on the read image in the shared memory 24 and writes the created image file in the shared memory 24 or the flash memory 28a. Then, the image saving task moves the FTP client task to the executable state after it has written the image file.

<Process 7>

After the FTP client task has been moved to the executable state, it becomes the execution state after the imaging control task, the decode control task, the decoded result transmission task, the image data transmission task, and the FTP server task have all been moved to the resting state, and the FTP client task transmits the image file to the FTP server 4.

<Process 8>

After the FTP server task has been moved to the executable state, it becomes the execution state after the imaging control task, the decode control task, the decoded result transmission task, and the image data transmission task have all been moved to the resting state.

After the FTP server task has been moved to the execution state, it checks whether or not there is the file transfer request is given from the FTP client 5, transfers the image file to the FTP client 5 when the file transfer request exists, and is then moved to the resting state. On the other hand, the FTP server task is immediately moved to the resting state when there is no file transfer request from the FTP client 5.

<Image Buffer>

Figure 4:
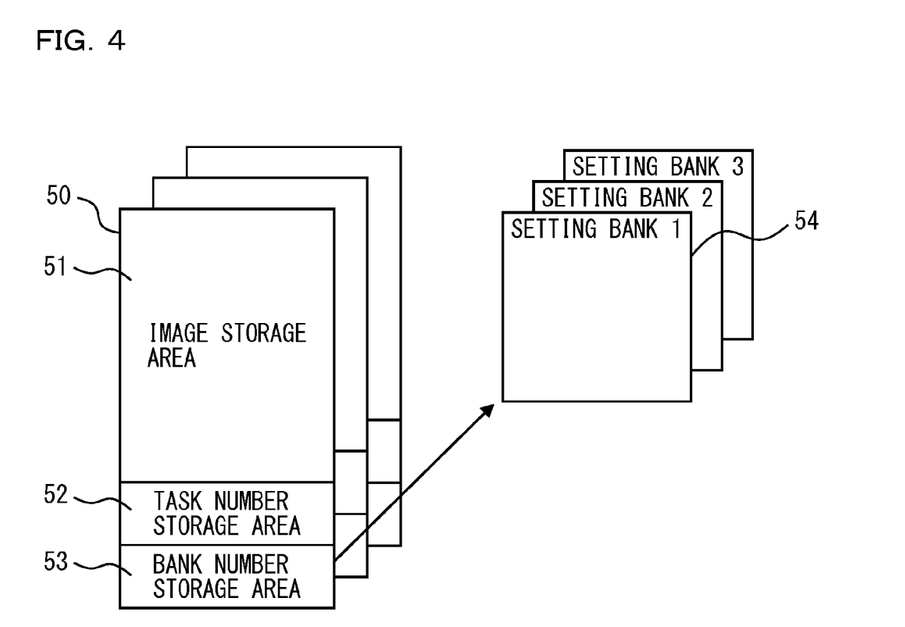
FIG. 4 is an explanatory diagram schematically showing one example of an operation of the code reader shown in FIG. 2, in which an image buffer and a setting bank are shown.

FIG. 4 is an explanatory diagram schematically showing one example of the operation of the code reader 20 shown in FIG. 2, in which an image buffer 50 and a setting bank 54 are shown. The read image transferred to the shared memory 24 by the DMAC 29 is held as the image buffer 50.

The image buffer 50 includes an image storage area 51 to hold the read image, a task number storage area 52 to hold the reference task number of the read image, and a bank number storage area 53 to hold the bank number to specify the setting bank 54.

The image storage area 51 stores a sheet of read image. The setting bank 54 is a memory area to hold various kinds of setting of the imaging parameter and the decoding parameter, and is created in the shared memory 24 or the flash memory 28a. As the imaging parameters, the exposure time, the gain, and the presence or absence of the filter are held. The plurality of image buffers 50 are previously formed in the shared memory 24.

When starting the reading operation, the imaging control task selects the unused image buffer 50, that is, the image buffer 50 whose reference task number is zero, as a transfer destination of the read image, commands the DMAC 29 to transfer the read image data by overwriting, and increments the reference task number of that image buffer 50. In addition, the imaging control task writes the bank number and the like in the image buffer 50.

The decode control task writes, in the shared memory 24, the head address and the data size of the read image data transferred to the image buffer 50, and the decoding parameter obtained from the setting bank 54 based on the bank number in the image buffer 50, and notifies the CPU 21 of the interrupt request.

When the CPU 21 starts the decoding process, the decode control task to which the interrupt request is given from the CPU 21 increments the reference task number of the image buffer 50 holding the read image to be decoded, and moves the image data transmission task to the executable state.

The image data transmission task decrements the reference task number of the image buffer 50 holding the read image which has been already transmitted. In addition, the image saving task decrements the reference task number of the image butter 50 holding the read image corresponding to the image file which has been already written.

<Code Reading Operation>

Figure 5:
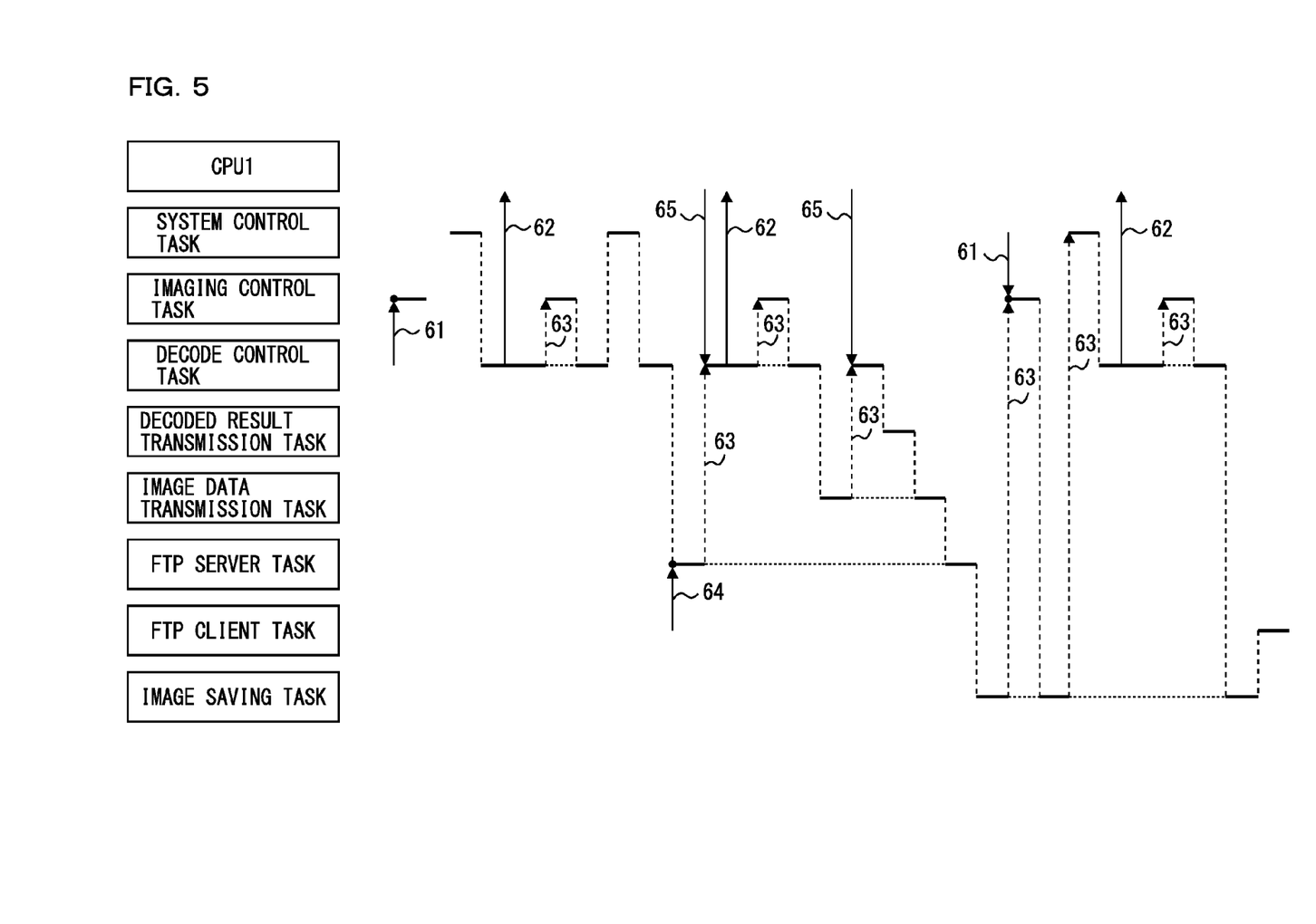
FIG. 5 is a timing chart showing one example of an operation of the code reader shown in FIG. 2 when a code is read.

FIG. 5 is a timing chart showing one example of a code reading operation of the code reader 20 in FIG. 2. When reading the code, the code reader 20 performs the priority scheduling among the decoding process by the CPU 21, and the imaging control task, the decode control task, the decoded result transmission task, the image data transmission task, the FTP server task, the FTP client task, and the image saving task performed by the CPU 22, by an interrupt handler operation of the system control task.

In FIG. 5, after a first reading start command 61 has been received, three sheets of read images are created, and the decode completion condition is established when the decoded result of the second sheet of the read image is obtained, whereby a series of reading process has been completed. In addition, just before the decoded result of the first sheet of the read image is obtained, a file transfer request 64 is given from the FTP client 5, and the FTP server task is moved to the execution state. Thus, after the FTP server task has been moved to the resting state, the image saving task is moved to the execution state and then the second reading start command 61 is received, and the optical reading is started again.

First, the imaging control task is moved from the resting state to the executable state, based on the reading start command 61. At this time, since the imaging control task has the highest priority, it immediately becomes the execution state, commands the imaging control circuit 25b to start the imaging operation, and is then moved to the resting state.

Then, the system control task moves the decode control task from the resting state to the executable state after the read image has all been transferred by the DMAC 29. At this time, since the imaging control task having the highest priority is in the resting state, the decode control task immediately becomes the execution state, and notifies the CPU 21 of an interrupt request 62.

The CPU 21 performs the decoding process of the read image, based on the interrupt request from the CPU 22. After notifying the CPU 21 of the interrupt request, the decode control task moves the imaging control task to the executable state at regular time intervals until the decode completion condition is established. When the imaging control task is moved to the execution state while the decode control task is being executed, a preemption 63 occurs and the decode control task loses its execution right and is moved to the executable state.

The FTP server task becomes the execution state after the imaging control task, the system control task, the decode control task, the decoded result transmission task, and the image data transmission task have all been moved to the resting state.

After the FTP server task has been moved to the execution state, it checks whether or not there is a file transfer request 64 from the FTP client 5, and transfers the image file to the FTP client 5 when the file transfer request 64 exists, and then the FTP server task is moved to the resting state.

The CPU 21 notifies the CPU 22 of an interrupt request 65 after the decoding process of the read image has been completed. The decode control task is moved to the executable state, based on the interrupt request from the CPU 21. At this time, the decode control task immediately becomes the execution state in the case where the imaging control task is in the resting state.

After the decode control task has been moved to the execution state, it moves the image data transmission task to the executable state. When the decode completion condition is established, the decoded result transmission task is also moved to the executable state.

After the decoded result transmission task has been moved to the executable state, it becomes the execution state after the imaging control task and the decode control task have all been moved to the resting state, and transmits the decoded result to the external device. The decoded result transmission task is moved to the resting state after the decoded result has been transmitted.

After the image data transmission task has been moved to the executable state, it becomes the execution state after the imaging control task, the decode control task, and the decoded result transmission task have all been moved to the resting state, and transmits the read image to the external device.

The image saving task is moved to the executable state when the decode completion condition is established. After the image saving task has been moved to the executable state, it becomes the execution state after the imaging control task, the system control task, the decode control task, the decoded result transmission task, the image data transmission task, the FTP server task, and the FTP client task have all been moved to the resting state, creates the image file based on the read image in the shared memory 24, and writes the created image file in the shared memory 24 or the flash memory 28*a*. Then, the image saving task moves the FTP client task to the executable state after writing the image file.

After the FTP client task has been moved to the executable state, it becomes the execution state after the imaging control task, the decode control task, the decoded result transmission task, the image data transmission task, and the FTP server task have all been moved to the resting state, and transfers the image file to the FTP server 4.

According to this embodiment, while the CPU 21 is decoding the read image, the CPU 22 efficiently executes the imaging control task, the decode control task, and the decoded result transmission task, which can reduce a time from start of reading of the symbol code until the decoded result of the read image is transmitted to the external device.

Moreover, since the command to transfer the read image data by overwriting to the shared memory 24 is given to the DMAC 29, based on the reference task number held in association with the read image, the read image generated by the imaging element 25*a* can be efficiently stored in the shared memory 24.

Moreover, in this embodiment, while the description has been made of the case where the reading operation is started when the reading start command is received from the external device through the LAN 11 or the serial communication interface 12, a trigger to start the reading operation is not limited to the above case. That is, another configuration may be employed as long as the command to start the reading operation is received from the external device and the reading operation is started based on the command to start the reading operation. For example, as another configuration, a voltage change in an input terminal connected to the external device may be detected, and the reading operation may be started based on its detected result.

What is claimed is:

1. A code reading device comprising:
   first and second processors that access a shared memory through a common data bus;
   an optical reading element that optically reads a symbol code to generate a read image;
   a transmitting and receiving circuit that receives a command to start a reading operation from an external device; and
   a DMA controller that transfers the read image from the optical reading element to the shared memory through the data bus, wherein
   the first processor includes a decoding device that decodes the read image in the shared memory, based on a command of the second processor, and writes a decoded result in the shared memory,
   the second processor selectively executes any one of an imaging control task that controls the optical reading operation by the optical reading element based on the command to start the reading operation, a decode control task that commands the first processor to decode the read image based on transfer completion of the read image by the DMA controller, and a decoded result transmission task that controls transmission of the decoded result from the transmitting and receiving circuit to the external device, and
   the imaging control task is given priority over the decode control task, and the decode control task is given priority over the decoded result transmission task, wherein
   the shared memory holds a reference task number of the read image provided in association with the read image, and
   the second processor commands the DMA controller to transfer the read image by overwriting to the shared memory based on the reference task number, increments the reference task number when any one of the imaging control task and the decode control task is executed, and decrements the reference task number when any one of the image data transmission task and the image saving task is executed.

2. The code reading device according to claim 1, wherein the second processor selectively executes any one of an image data transmission task that controls transmission of the read image from the transmitting and receiving circuit to the external device, the imaging control task, the decode control task, and the decoded result transmission task, and the decoded result transmission task is given priority over the image data transmission task.

3. The code reading device according to claim 2, wherein the shared memory includes a nonvolatile memory, the second processor selectively executes any one of an image saving task that writes the read image in the shared memory into the nonvolatile memory, the imaging control task, the decode control task, the decoded result transmission task, and the image data transmission task, and the image data transmission task is given priority over the image saving task.

4. The code reading device according to claim 1, wherein the read image transferred to the shared memory by the DMA controller is held as an image buffer, the image buffer includes an image storage area to hold the read image, a task number storage area to hold a reference task number of the read image, and a bank number storage area to hold a bank number to specify a setting bank.

5. The code reading device according to claim 4, wherein the setting bank is a memory area to hold a decoding parameter, wherein a decode control task writes in the shared memory the decoding parameter obtained from the setting bank based on the bank number in the image buffer.

* * * * *